Figure 1:
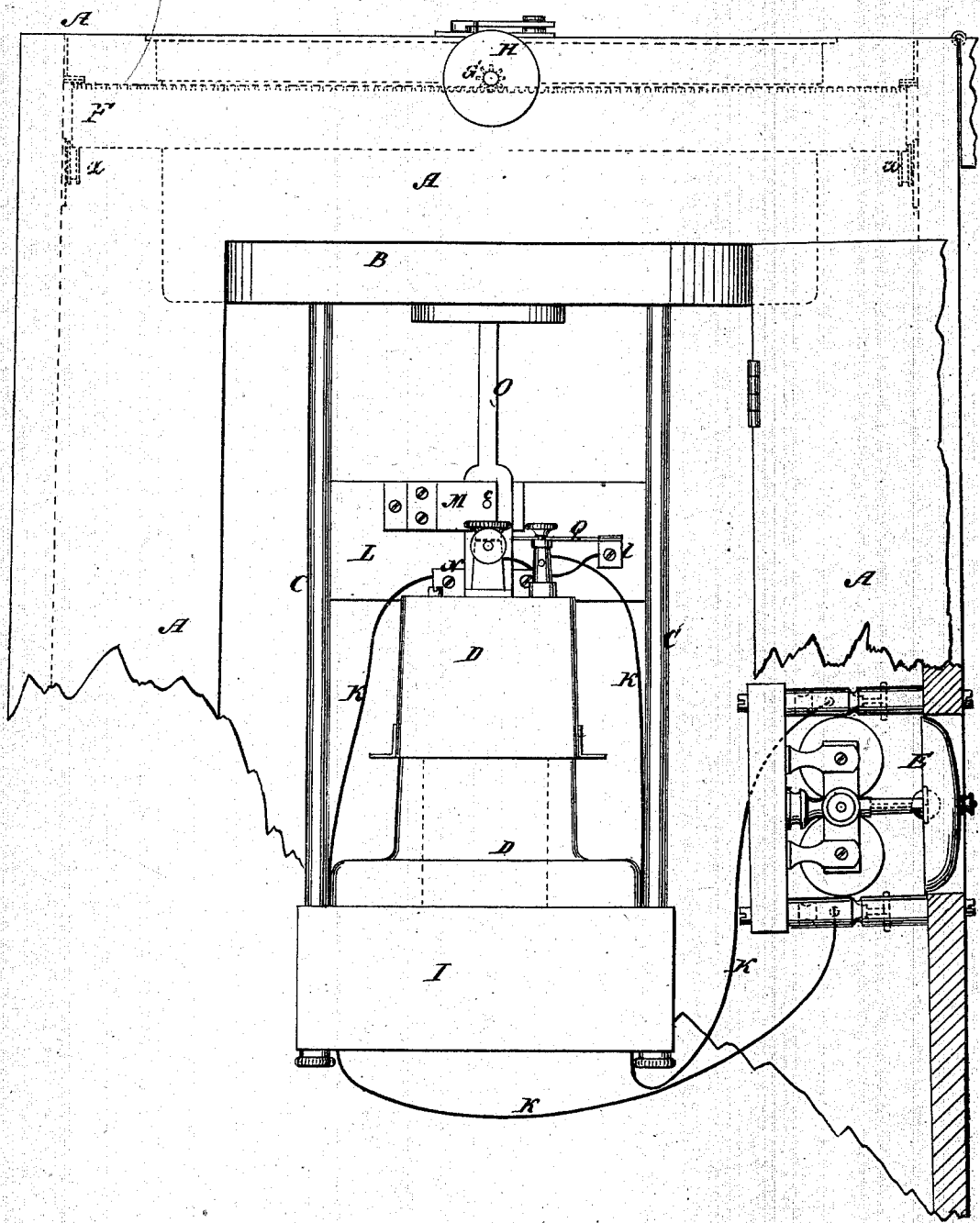

J. B. ANDREWS.
Electric Ship-Alarms.

No. 146,421.

Patented Jan. 13, 1874.

3 Sheets--Sheet 3.

Witnesses:
E. Wolff
Jacob Felbel

Inventor:
James B Andrews
By his attorney
J. N. McGuire

AM. PHOTO-LITHOGRAPHIC CO. N.Y. (OSBORNE'S PROCESS.)

UNITED STATES PATENT OFFICE.

JAMES B. ANDREWS, OF NEW YORK, N. Y.

IMPROVEMENT IN ELECTRIC SHIP-ALARMS.

Specification forming part of Letters Patent No. 146,421, dated January 13, 1874; application filed November 6, 1873.

*To all whom it may concern:*

Be it known that I, JAMES B. ANDREWS, of New York city, of New York county, in the State of New York, have invented an Alarm for Indicating Changes in the Course of a Ship; and I do hereby declare that the following is a full and exact description thereof, reference being had to the accompanying drawings and to the letters of reference marked thereon.

As in the construction and management of ocean steamers every appliance or apparatus which can contribute to safety is of vital importance, it will be understood that any means which will automatically and with certainty not only indicate at all times the course which the ship is pursuing, but will operate independently of the steering-compass and pilot, acting as a perfect check on the latter, and giving an alarm the moment the ship's course varies or is changed, must be of great utility.

It frequently occurs that the steering or guidance of the ship has to be intrusted to some person under orders from the captain as to the course to be pursued or the precise points of the compass to which the ship is to be kept, and under such circumstances there is no possible means now known or used by which the captain during his absence (for necessary rest, for instance) can know of any change which may occur in the direction of the ship's progress—that is to say, it is utterly impossible for him to know in what course the ship is sailing without consulting the compass, or whether or not the ship is kept in the ordered course, or allowed by lack of diligence on the part of the pilot to vary therefrom, or has her course purposely changed for some good but unanticipated reason.

My invention has for its object to provide the ship with some means by which the captain or any officer will, with unerring certainty, be warned by an alarm of every variation, either accidental or intentional, which may occur in the ship's course of passage during his absence from the pilot's post; and to this end my invention consists in an apparatus which may be carried to or located in the captain's state-room, or in any other desired part of the ship, and which, by means of an electric alarm device so combined with the needle of a compass that any change in the position of the ship will cause the needle to move a circuit making and breaking device and start an electric bell, will instantly denote, by an alarm, any change in the ship's course.

To enable those skilled in the art to make and use my invention, I will proceed to fully describe the construction and operation of an apparatus which I have constructed and used in carrying out my invention, referring by letters to the accompanying drawings, in which—

Figure 2:
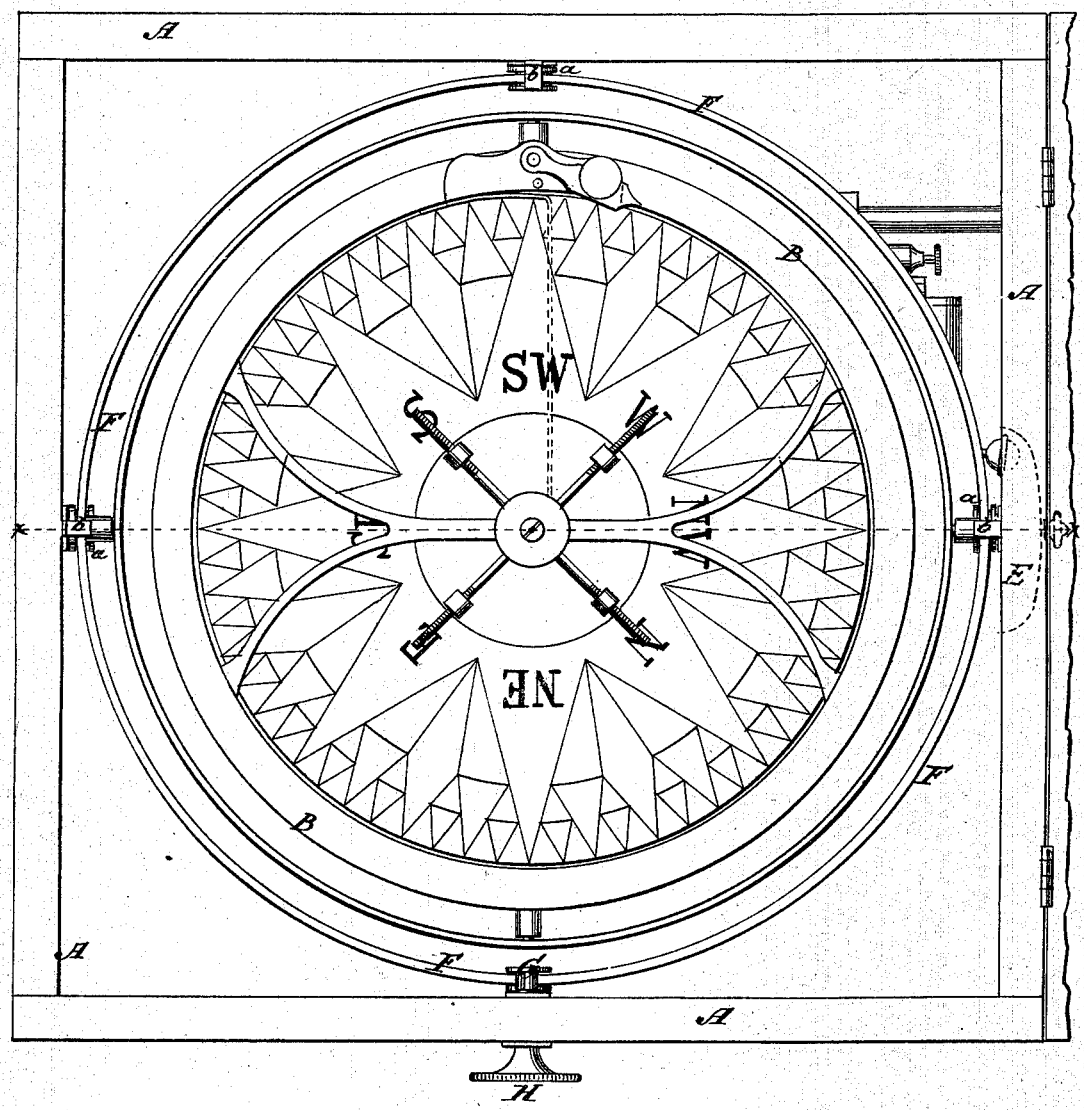
Figure 3:
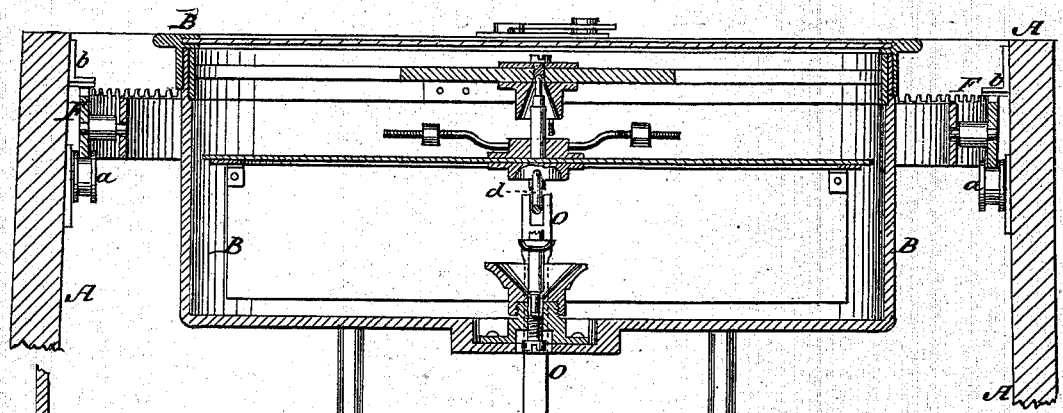
Figure 4:
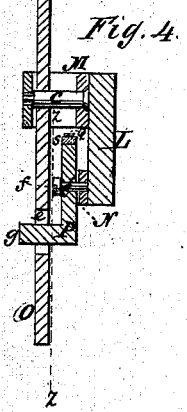
Figure 5:
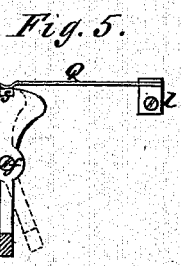

Figure 1 is a side elevation; Fig. 2, a top view; Fig. 3, a vertical section at $x\,x$, Fig. 2; Fig. 4, a partial vertical section at $y\,y$, Fig. 3; and Fig. 5, a detail sectional view at $z\,z$, Fig. 4.

In the several figures the same part will be found designated by the same letter of reference.

A represents a box or case, which may be made of any size and design, and which serves merely for the attachment to it and the support of the different parts of the machine or apparatus, which consists of an ordinary compass, B, which is supported in the upper part of the case A, in such a manner that its body can be turned, and which has attached to it, so as to depend from its under side, a frame-work, C, in which is carried an ordinary galvanic battery, D, the wires from the poles of which are connected to an electric bell, E, and a device, which will presently be described, located between the battery and bell, and which is actuated by the needle of the compass, to make and break the circuit of the battery. The compass body or case B is provided with an annular surrounding rim-piece, F, which rests and rides freely on four, more or less, supporting-wheels, $a$, hung on the inside of the box A, and which are so grooved as to assist in the retention in proper place of the said rim F, which is held or retained from above by shoe pieces or lugs $b$. The upper edge of the rim F has gear-teeth cut in it, with which mesh the teeth of a spur-pinion, G, mounted on one side of the box A, and having its shaft provided with a knurled hand-wheel, H, which can be readily operated with the thumb and finger. The pendent frame-work C, referred to, is composed of four rods, attached at their upper ends to the compass-case B, and carrying at their lower ends a shallow box or case, I, in which is set and held the battery D. This battery may be of any proper form and character for generating an electric current, which passes through the wires K K, and is employed to operate the electric bell E, in the manner and for the purpose to be presently explained. This bell E may be of the usual kind, and is, for convenience, attached to the box A, with the magnets inside and the bell outside, as illustrated. Its precise location is, of course, not material so long as it is properly placed to be connected with the battery, and so that the bell will be heard. On the frame-work C is secured a cross bar or stand, L, to which are secured the parts constituting the circuit making and breaking mechanism, and which is made and operates as I will now explain: On the stand M is pivoted (at $c$) a vertical oscillatory arm, O, the upper portion of which passes up into the compass-box, and is so bifurcated at its extremity as to straddle the wire $d$ of the compass-needle, and the lower portion or leg of which is cut out, as seen at $e$, Fig. 3. On the stand N is pivoted (at $f$) another smaller oscillatory arm or bar, P, arranged about parallel with the arm O, and formed with a projecting portion, $g$, that passes through the opening $e$ in arm O, so that two set-screws, $i\ i$, in the arm O will come in contact with said portion $g$ of arm P to effect the movement of the latter, as will be presently explained. The top of the arm P is curved like a rocker, and has placed in it an insulating-block, $s$, and on top of this rocker-like portion of arm P rests one end of a spring-bar, Q, the other end of which is fastened in the stud $l$, to which is also connected one of the wires K of the battery. One of the wires K passes from one pole of the battery directly to the alarm-bell device, and the other runs from said bell back to the stand N, to which it is connected, and from the stud $l$ passes a short wire to the other pole of the battery. Thus the circuit is formed through the stand N, its arm P, the spring-bar Q, and stud $l$; and by means of an insulation of the arm P from the spring-bar Q this circuit is broken, as I will now explain. Immediately on top of the arm P is arranged the insulating block or pad $s$, upon which rests the end of spring Q, so that when the parts are in their normal condition or positions the circuit is broken or interrupted at $s$, and the bell is inoperative.

As the needle of the compass always maintains the same position, it follows that any change in the relative positions of said needle and the upper end of the arm O must arise from a change in the position of said arm, or, in other words, must arise from some change in the position of the ship.

The moment any such change in the relative positions of the needle and ship occur, the bifurcated upper end of the arm O comes in contact with the wire $d$ of the compass or compass-needles, and, as the tendency of the said wire, being connected to the needles, is to maintain its given or normal position, and the arm O is so adjusted as to be moved by a very delicate force, it follows that the said arm O, by its contact with the wire $d$, is vibrated in one or the other direction, and the moment this arm is so vibrated the arm P is moved in one or the other direction by the set-screws $i\ i$ of arm O coming against and pushing the portion $g$, and the insulator $s$ moves from under the end of spring Q, permitting said bar Q to come in contact with the upper rocker-like face of the arm P, and thus form or complete the circuit through the said arm P, bar Q, stand N, and stud $l$, as before mentioned, which will instantly start the alarm-bell. Thus, by any deviation in the relative positions of the ship and compass from that to which the apparatus may have been adjusted or set, will the electric bell be set going to give an alarm of such change. It is to permit the adjustment of the apparatus so that the ship and compass can maintain any given relative position without any operation of the alarm that the compass box or case, from which is suspended the battery and circuit making and breaking mechanism, is so mounted and arranged with the rim F F and pinion G that the whole fixture can be set or moved to that position relative to the compass in which the wire $d$ will not come in contact with the upper bifurcated end of arm O.

From the description given, it will be understood that, in the use of my invention, the operation is simply this, viz: When it is desired to check the pilot, or insure a warning of any change in the ship's course, the apparatus is so adjusted or set, by turning the pinion G, that the arm $o$ will balance on its pivot, out of contact with, and unaffected by, the needle of the compass. The moment any change takes place in the course of the ship, the upper end of arm $o$ comes in contact with the unchangeable wire $d$ of the needle; said arm is slightly vibrated on its axis of oscillation, and turning with it the arm P, the circuit of the battery is completed and the electric bell started.

In carrying out my invention, various modifications may be made, such, for instance, as the use of a different battery, a different alarm bell or device, and the breaking of an electric circuit, to start some sort of an alarm apparatus, in lieu of making the circuit, as described, and other changes, without departing from my invention, the gist of which is in the idea of combining with the magnetic needle any suitable mechanism which, when the position of the ship changes, will be influenced by the needle to start an alarm, or indicate such change.

If it should prove practicable to employ, in connection with the needle of the compass, some sort of mechanism which could be effected to start an alarm without the interposition or use of an electric current, then my invention could be practiced without the employment of any battery at all.

It is the magnetic needle, of course, and the utilization of its fixed tendency to remain in a given position, which is the essential feature of the compass used, and without the other portions of the compass proper (shown) could the alarm be given; but it is more convenient to use the complete compass shown, as then, when an alarm is given, the person present can, by turning the box of the compass so as to readjust the apparatus to break the circuit, or by restoring the alarm apparatus and needle to their former relative positions, observe, by the compass, the changed course of the ship.

As it is often the case that it is impracticable to keep the ship steadily in a given course or path of progress, and as it may not be desirable to have the alarm started at every slight deflection from a straight path of motion of the ship, I employ the set-screws $i\ i$, between the ends of which the projection $g$ of arm P is located; and I turn these set-screws nearer toward, or farther from, the part $g$, according to the amount of play or motion which it may be desired to permit in the arm $o$, without the latter affecting the arm P, which makes and breaks the circuit.

In lieu of these set-screws and this method of permitting any certain amount of motion or deflection of the ship (in heavy weather, for instance) without putting the alarm into operation, any other proper mechanical contrivance may be used adapted to this purpose, and any suitable mode of attaining the described object, in this particular, may, of course, be adopted, without departing from the spirit of my invention.

If found expedient or advisable, some suitable means may be employed by which it can be observed, from the deflection of the arm $o$ from its normal vertical condition, just when and how much the course of the ship is changed; and it will be understood that, in practicing my invention, many modifications and additions may be found advisable, the expediency of which can be determined by experience and a comparatively long and practical test of the apparatus.

Any and all such changes and additions as may, however, prove desirable, must depend upon the principles of construction and operation which I have explained as constituting the gist of my invention.

Having now so fully explained my invention that those skilled can understand and practice it, what I claim as new, and desire to secure by Letters Patent, is—

In combination with a magnetic needle or bar, suitable means adapted to be influenced by any change in the relative position of said needle with the ship, and an alarm device for denoting such change, substantially as hereinbefore set forth.

In witness whereof I have hereunto set my hand and seal this 24th day of October, 1873.

JAMES B. ANDREWS. [L. S.]

In presence of—
A. ASCHER,
JACOB FELBEL.